May 23, 1967  H. A. CORBETT  3,320,636
MULTI-PLY FLOW DIVERTER FOR THERMOPLASTIC MATERIALS
Filed Sept. 20, 1965  3 Sheets-Sheet 3
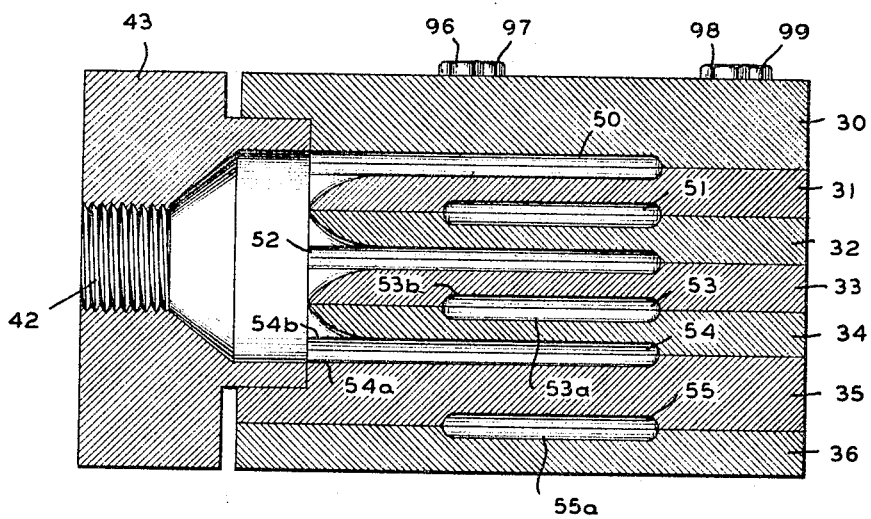
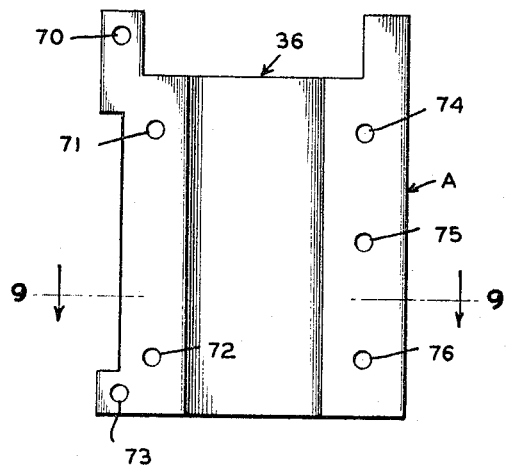
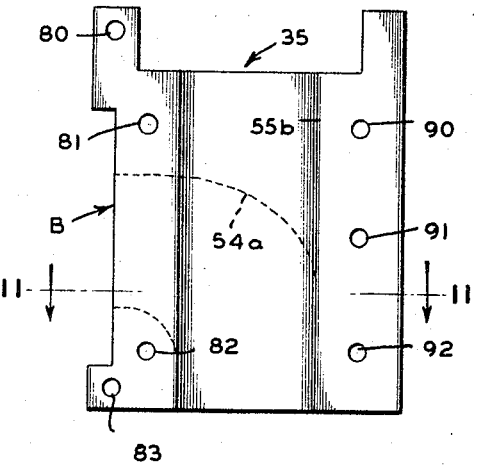
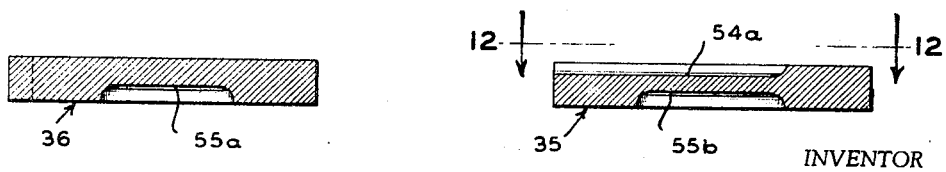
INVENTOR
HERBERT A. CORBETT
BY Allen A. Meyer, Jr.
ATTORNEY United States Patent Office 3,320,636
Patented May 23, 1967

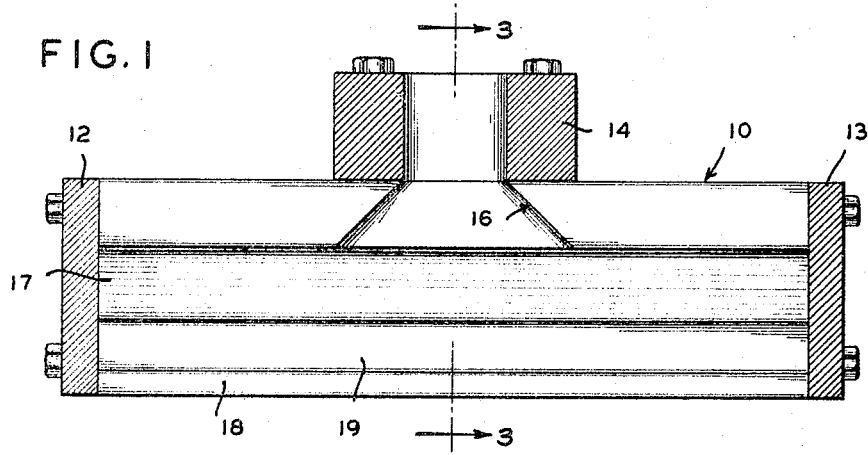
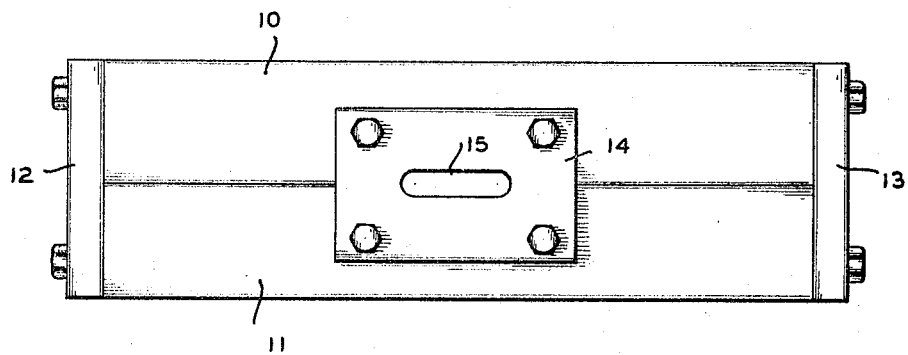
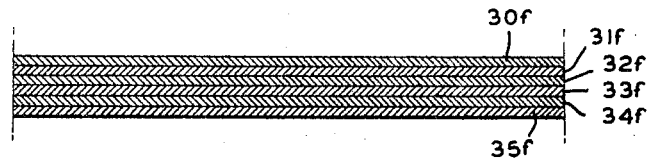
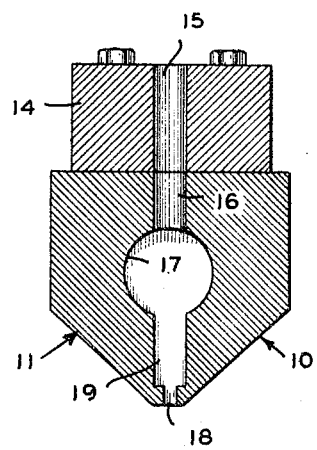
INVENTOR
HERBERT A. CORBETT

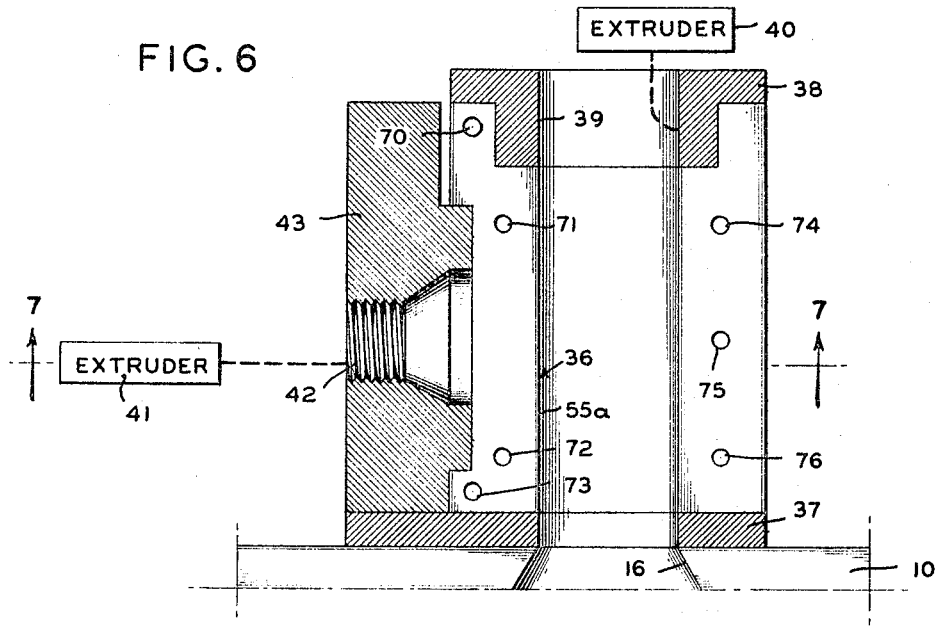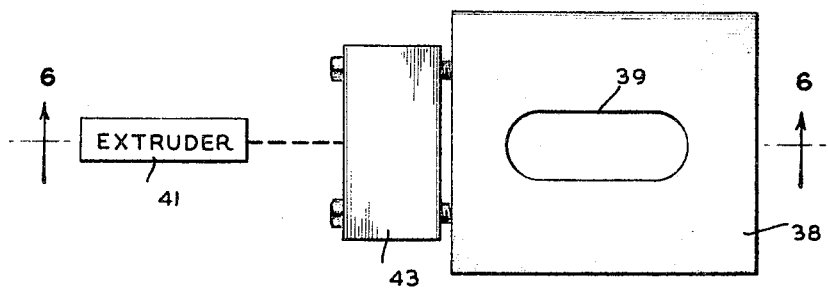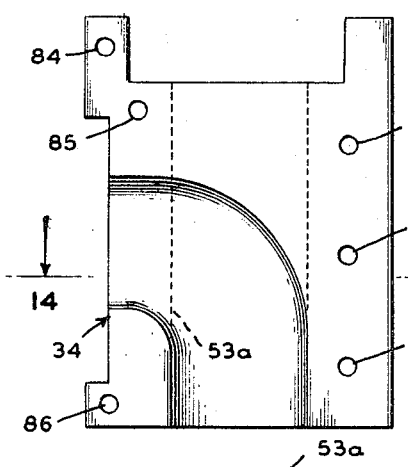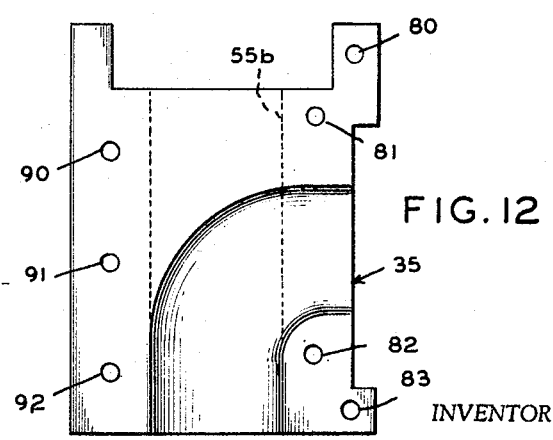

3,320,636
MULTI-PLY FLOW DIVERTER FOR THERMO-
PLASTIC MATERIALS
Herbert A. Corbett, Auburn, N.Y., assignor to National
Distillers and Chemical Corporation, New York, N.Y.,
a corporation of Virginia
Filed Sept. 20, 1965, Ser. No. 488,408
3 Claims. (Cl. 18—13)

This invention relates to an extrusion die for the extrusion of thermoplastic film, and more specifically relates to a novel extrusion die which is formed of a plurality of plates defining alternate passages for a first and second extruder which are to be connected to the die, thereby permitting the laminated flow of alternate layers of extruded material toward the exit orifice of the die.

Accordingly, a primary object of this invention is to provide a multichannel flow diverter for an extrusion die for thermoplastic materials.

Yet another object of this invention is to provide a novel series of flow-diverting plates for alternately conducting the flow from a first and second extruder toward the exit orifice of the extrusion die.

Yet another object of this invention is to provide a novel die structure to permit the formation of any desired number of plies of thermoplastic material.

It is a further object of the invention to permit the extrusion of any desired number of plies or layers in a thermoplastic film by the simple addition or subtraction from a stack of similar diverter plate sections.

These and other objects of this invention will become apparent from the following description when taken in connection with the drawings, in which:

FIGURE 1 is a cross-sectional view through a standard extrusion die for the extrusion of thermoplastic film or sheet.

FIGURE 2 is a top plan view of the die illustrated in FIGURE 1.

FIGURE 3 is a transverse sectional view taken on the line 3—3 of FIGURE 1.

FIGURE 4 is a cross-sectional view of the type of film which can be extruded from a die of the general type of FIGURES 1, 2 and 3 when the flow diverter of the invention is added to the die of FIGURES 1, 2 and 3.

FIGURE 5 is a top view of the flow diverter of the present invention.

FIGURE 6 is a cross-sectional view of FIGURE 5 taken across the line 6—6 in FIGURE 5, and illustrates the internal structure of the flow diverter which is connected to the different FIGURES 1, 2 and 3.

FIGURE 7 is a cross-sectional view of FIGURE 6 taken across the line 7—7 in FIGURE 6, and illustrates the manner in which any desired number of plates may be stacked for providing alternate flow channels from two extruder inputs.

FIGURE 8 is a plan view of the bottom plate of FIGURE 7.

FIGURE 9 is a cross-sectional view of FIGURE 8 taken across the line 9—9 in FIGURE 8.

FIGURE 10 is a plan view of the second from the bottom plate in the stack of FIGURE 7.

FIGURE 11 is a cross-sectional view of FIGURE 10 taken across the line 11—11 in FIGURE 10.

FIGURE 12 is a view of the plate of FIGURES 10 and 11 as seen from the line 12—12 in FIGURE 11.

FIGURE 13 is a front view of the third plate from the bottom in FIGURE 7.

FIGURE 14 is a cross-sectional view of the plate of FIGURE 13 taken across the line 14—14 in FIGURE 13.

Referring now to FIGURES 1, 2 and 3, I have illustrated therein a typical prior art extrusion die for the extrusion of flat thermoplastic film. Thus, the die of FIGURES 1, 2 and 3 includes a pair of opposing die lips 10 and 11 which are clamped to one another by some suitable clamping arrangement, and are provided with end caps 12 and 13 which are similarly connected to the die lips 10 and 11 by some suitable clamping or bolting arrangement.

A connection pad 14 is then suitably connected to the die lips 10 and 11 as by a suitable bolt means and provides means for the connection of the die to a suitable extruder. The clamping pad 14 then has a channel 15 extending therethrough which is in communication with a fan-tail-shaped input channel 16 in the opposing die lips 10 and 11 which leads to an elongated channel 17 which extends across the width of the die. Channel 17 then extends to the extrusion or exit orifice 18 through the channel 19, whereupon molten thermoplastic material under pressure from an extruder connected to channel 15 is forced through the fantail 16 and fills up the extending channel 17 and is extruded through channel 19 out of the exit 18 as a flat sheet.

Arrangements are known for the modification of this type of die for the extrusion of a laminated plastic which is composed of two or more layers of materials which may have diverse properties and which are obtained from two or more extruders. Apparatus of this type is shown in copending application Ser. No. 350,220 filed Mar. 9, 1964 in the name of Herbert O. Corbett entitled "Laminated Products, and Methods and Apparatus for Producing the Same" and assigned to the assignee of the present invention.

The novel structure of the present invention, which is shown in detail in FIGURES 5 through 14, has for its primary purpose the modification of the die of FIGURES 1, 2 and 3 to a die which can extrude any desired number of plies or layers in the extruded film.

Thus, as shown in FIGURE 4, which is a partial section through the sheet or film being extruded through exit orifice 18, the sheet is formed of six layers 30f through 35f wherein alternate layers or plies may have diverse properties. Alternatively, all of the layers may be of the same material, and the material extruded as a plurality of individual layers for purposes of insuring freedom from pin holes.

Referring now to FIGURES 5 through 14, the novel flow diverter of the invention and for the extrusion of six plies is formed of the stack of plates 30 through 36, shown in FIGURE 7.

Referring to FIGURE 6, this stack of plates is connected to a pad 37, which replaces pad 14 of FIGURES 1 and 3, by any suitable bolt means. The pad 37 then communicates with the fantail 16 in the manner shown in FIGURES 1 and 6.

The upper end of the stack is secured to an inlet pad 38 (FIGURES 5 and 6) which has an inlet orifice 39 which is connectable to a first extruder 40. The extruder 40 is, for example, the same extruder that would be connected to pad 14 in FIGURES 1 and 3.

In accordance with the invention, and as will be more fully described hereinafter, the package of plates 30 through 36 define alternate passages extending from orifice 39 and extruder 40 to the fantail section 16 and thus the extrusion die.

Further in accordance with the invention, a second extruder 41, shown in FIGURES 5 and 6, is connected to the inlet orifice 42 of inlet pad 43 which is connected to the stack of plates 30 through 36 by any suitable bolt means.

The orifice 42 is then connected to alternate passages defined by the stack of plates 30 through 36 which interleave with the passages extending from orifice 39, whereupon the extruded material entering fantail 16 of the extrusion die will be formed of alternate layers of materials from extruder 40 and extruder 41.

Thus, in FIGURE 4, the layers 30f, 32f and 34f will be of material coming from extruder 40, while the alternate layers 31f, 33f and 35f are of the material coming from extruder 41.

The manner in which the stacked plates 30 through 36 define the alternate flow channels for extruders 40 and 41 is illustrated most clearly in FIGURE 7. Thus, in FIGURE 7, the plates 30 through 36 define the flow channels 50, 51, 52, 53, 54 and 55. Channels 51, 53 and 55 are connected to the orifice 39, while channels 50, 52 and 54 are connected to the inlet orifice or passage 42 which is connected to the second extruder. Thus, alternate passages between the plates are connected to alternate extruders.

The construction of plate 36 is shown in more detail in FIGURES 8 and 9 and has a single channel 55a therein which defines one side of channel 55.

The next plate 35 is shown in detail in FIGURES 10 and 11, and has a straight channel section 55b therein which lies adjacent channel 55a of plate 36, and extends from inlet orifice 39 to fantail 16. Thus, the first channel 55 extending from extruder 40 to the fantail 16 is defined. Note that the opposing engaging surfaces of plates 35 and 36 will be suitably machined to form a sealed connection around channel 55.

The lower half of channel 54 is then defined in the opposite surface of plate 35 which has an L-shaped channel 54a therein. This L-shaped channel 54a then cooperates with a similarly shaped L-shaped channel 54b in the next plate 34, shown in FIGURES 13 and 14. Thus, the channel 54 will extend from the orifice 42 to the fantail section 16, and is isolated from the extruder 40 and the channels 51, 53 and 55.

The opposite side of plate 34 is then formed of a single straight channel section 53a which cooperates with a similar straight section 53b in the next plate 33. The plate 33 is constructed as the mirror image of plate 34 so that the channel sections 53a and 53b will extend parallel to one another from the extruder 40 to the fantail 16 of the extrusion die.

The opposite surface of plate 33 then has an L-shaped channel therein similar to channel 54b of FIGURES 13 and 14 which cooperates with a similar channel in plate 32, thereby defining the channel 52 extending from inlet 42 to fantail 16.

Note that plates 32 and 34 are identical in construction, while plates 31 and 33 are identical in construction.

Moreover, it will be noted that by assembling more pairs of plates similar to plates 31 through 34 in the interior of the diverter, any number of alternate channels can be created which lead alternately from extruder 40 and extruder 41 to the fantail 16. That is to say, by increasing the number of plates used in the diverter, any desired number of laminates in the extruded film can be formed.

The upper end plate 30 then has a construction similar to the upper surface of plate 35, but as a mirror image of plate 35, thereby to define the last orifice 50 which leads from the extruder 41 to the fantail input channel 16.

In order to rigidly connect the various plates of FIGURE 7 to one another, a plurality of bolt openings are provided in the plates which are aligned with one another. Thus, the plate 36 will have the four bolt holes 70, 71, 72 and 73 on one side thereof, and the bolt holes 74, 75 and 76 on the other side thereof.

Each of the remaining plates will have aligned bolt openings. By way of example, plate 35 will have bolt openings 80, 81, 82 and 83 which are aligned with bolt openings 70 through 73, respectively, of plate 36.

Similarly, the plate 34 and all the remaining plates will also have bolt openings such as the bolt openings 84, 85 and 86, shown in FIGURE 13, for plate 34 which are aligned with openings 70, 71 and 72 for plate 36 of FIGURE 8.

Similarly, plate 35 will have openings 90, 91 and 92 which are aligned with openings 74 through 76, respectively, for plate 36 and openings 93, 94 and 95, respectively, for the plate 34 of FIGURE 13. Thus, each of the plates of the stack have suitably aligned openings for the reception of some suitable bolt means shown in FIGURE 7 by the bolt heads 96, 97, 98 and 99 whereby the entire plate assembly can be rigidly bolted together.

Although this invention has been described with respect to its preferred embodiments, it should be understood that many variations and modifications will now be obvious to those skilled in the art, and it is preferred, therefore, that the scope of the invention be limited not by the specific disclosure herein, but only by the appended claims.

What is claimed is:

1. In combination: an extrusion die comprising a pair of elongated die lips defining an elongated extrusion exit orifice and an input channel extending from one surface of said die to said exit orifice, a first and second extruder, and a flow diverter connected between said first and second extruders and said input channel of said extrusion die for forming the flow of material from said first and second extruders into said input channel into a plurality of alternate layers of material from said first and second extruders, respectively; said flow diverter including first and second inlet orifices for communication with said first and second extruders; a first plurality of flow channels extending from said first inlet orifice to the input channel of said extrusion die and a second plurality of flow channels interleaved with said first plurality of flow channels and isolated therefrom and extending from said second inlet orifice of said flow diverter to said input channel, one of said pluralities of flow channels being constituted by straight channel sections while the other of said pluralities of flow channels is constituted by L-shaped channel sections.

2. The combination as set forth in claim 1 wherein said first plurality of channels are defined by straight cutout sections in the opposing surfaces of first adjacent pairs of plates and said second plurality of channels are defined by L-shaped cutout sections in the opposing surfaces of second adjacent pairs of plates; each of said channels of said first and second plurality of channels having input and output ends; the output ends of said first and second plurality of channels parallel to one another and in a common plane; the input ends of said first plurality of channels terminating in a plane perpendicular to the input ends of said second plurality of channels.

3. The combination as set forth in claim 2 wherein alternate plates of said stacked plates are identical in construction; adjacent plates of said stacked plates constructed as the mirror image or one another.

References Cited by the Examiner

UNITED STATES PATENTS

| 1,397,571 | 11/1921 | Bowen. | |
| 2,820,249 | 1/1958 | Colombo | 18—12 X |
| 2,897,543 | 8/1959 | Weston et al. | 18—13 |
| 2,985,556 | 5/1961 | Rowland. | |
| 3,241,503 | 3/1966 | Shafer | 18—13 X |

FOREIGN PATENTS 24,246  11/1963  Japan.

WILLIAM J. STEPHENSON, *Primary Examiner.*